Dec. 17, 1957 A. J. HACK ET AL. Re. 24,408
SOLID ELECTROLYTE BATTERY
Original Filed Sept. 2, 1954
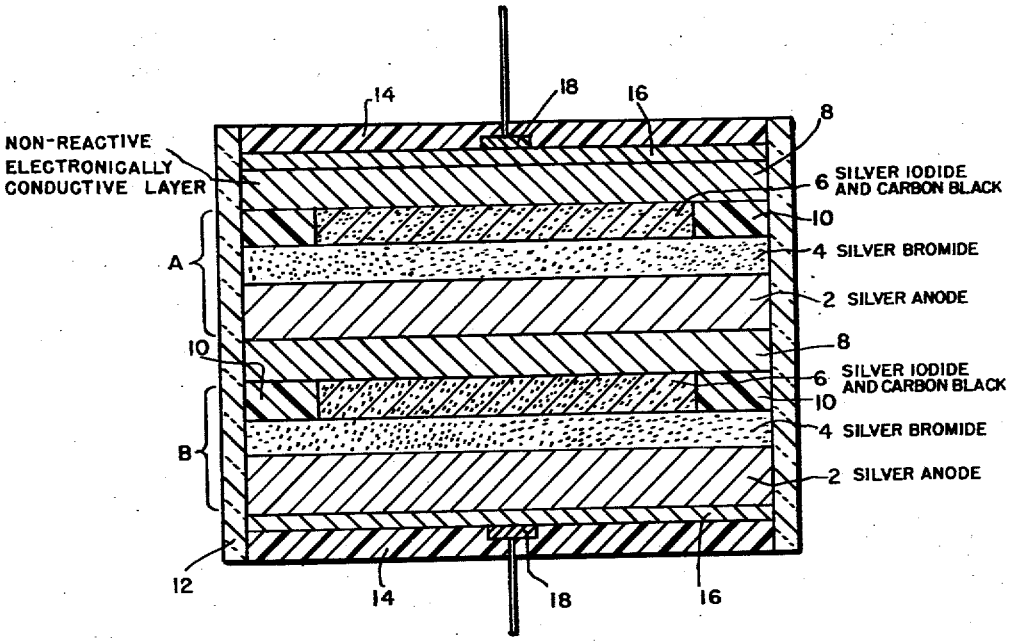
INVENTOR.
ANDREW J. HACK
STUART J. SHAPIRO
WILLIAM SHORR
BY Harry M. Saragovitz
ATTORNEY United States Patent Office Re. 24,408
Reissued Dec. 17, 1957

24,408

SOLID ELECTROLYTE BATTERY

Andrew J. Hack, Eatontown, Stuart J. Shapiro, Red Bank, and William Shorr, Little Silver, N. J., assignors to the United States of America as represented by the Secretary of the Army Original No. 2,802,895, dated August 13, 1957, Serial No. 453,975, September 2, 1954. Application for reissue September 27, 1957, Serial No. 686,804

2 Claims. (Cl. 136—83)

(Granted under Title 35, U. S. Code (1952), sec. 266)

The invention described herein may be manufactured and used by or for the Government for governmental purposes, without the payment of any royalty thereon.

This invention relates to batteries and more particularly to a pile type solid electrolyte battery of appreciable voltage and having long shelf life.

In U. S. Patent No. 2,689,876, "Solid Ion Electrolyte Battery," inventor Lehovec, filed on June 17, 1953, there is disclosed a miniature primary cell wherein the electrolyte is of the solid crystalline type. In such cells, for example, where the system consists of silver as the anode, iodine as the depolarizer, and a silver halide as the solid crystalline electrolyte, much difficulty is presented in stacking the cells to obtain series voltage additions while yet maintaining minuscule size of the battery. Another difficulty resides in the fabrication of a pile type battery of stacked cells wherein each respective constituent of the battery system is properly isolated from the other constituents so that internal leakages, short circuits, and corrosions are prevented and a long shelf life for the battery is made possible.

It is, accordingly, the primary object of the present invention to provide high voltage miniature pile type battery of long shelf life comprising a stack of solid crystalline electrolyte cells.

It is a further object to provide a battery as set forth in the preceding object wherein the cell system consists of a silver anode, an iodine depolarizer, and a solid crystalline silver bromide electrolyte.

In accordance with the present invention there is provided a high voltage miniature battery comprising a stack of a plurality of primary cells, each of the cells consisting of a solid anode layer, a solid depolarizer layer and a solid crystalline electrolyte between and in contact with the anode and the depolarizer layers, and a non-reactive conductive layer between and in contact with the anode layer of one cell and the depolarizer layer of another cell.

For a better understanding of the invention, together with other and further objects thereof, reference is had to the following description taken in connection with the accompanying drawings and its scope will be pointed out in the appended claims.

Referring more particularly to the drawing there is shown a preferred embodiment of the present invention. For convenience a stack of two cells are shown although any number may be used. The basic cell A or B comprises in this embodiment a disc of silver foil 2 having a solid crystalline layer of a silver halide 4 such as silver bromide on one face thereof. A layer 6 of depolarizer is present on the silver halide layer and consists of solid iodine dispersed in finely divided carbon black.

The silver halide layer 4 may be made by several methods such as with pellets of the halide, by electroplating, or by direct combination of the halogen with the silver, in an evacuated, heated reaction vessel. The latter direct reaction technique has been found to be preferable. For example, using a silver foil 1 to 10 mils thick, a 0.1 to 2.0 mil layer of silver bromide may be provided by tarnishing the silver foil in a heated chamber containing bromine vapor. To restrict silver halide layer 4 to one face of the silver foil, the foil may be folded and sealed at all seams prior to forming the layer. An alternative method for production of silver halide coated silver foil is to configure the foil into a cylinder and to utilize a reaction chamber in the form of an external jacket with the cylinder of silver foil continuously passing through the chamber. Another method is to utilize the silver foil cylinder itself as the reaction chamber with bromine introduced thereinto by means of a tube running coaxially along the length of the silver foil cylinder. After silver halide layer 4 is formed, the foil of course is opened and there is thus provided one surface of untarnished silver. In the formation of the constituent cells of the battery, discs of a diameter of 0.5 inch readily may be punched from the prepared foil. The dimensions of the disc are not critical and may be of any suitable desired size.

The depolarizer layer 6 may preferably be provided by forming a film comprising a mixture consisting of iodine, a carbon black and a film forming resin. A preferred carbon black of high purity is made from acetylene gas by thermal decomposition at a temperature above 1500° C. It is graphitic although not completely graphitized and possesses high absorptive properties. The film forming resin is preferably an elastomeric resin such as polyvinyl and need not be non-reactive with or impervious to iodine. To limit the amount of film forming resin which is necessary in the depolarizer layer formation, a matrix which may be a fabric such as nylon mesh is used to provide body to the film thus facilitating the handling thereof and enabling the punching of depolarizer discs therefrom. A preferred concentration of iodine in the depolarizer mixture is 80 to 90% by weight so that a depolarizer disc 0.375 inch in diameter and 10 mils thick will contain about 60 milligrams of iodine. In the present embodiment, preferable thicknesses of the depolarizer disc are from 4 to 15 mils. Other examples of depolarizer mixtures are finely ground intimate mixtures of graphite or high purity black with iodine pentoxide, cupric chloride, cupric bromide, aurous iodide, periodic acid, and the like.

The layer 8 between the cells is a thin layer, about 0.8–1.0 mil thick of an electronically conductive impervious material which is not chemically reactive with either depolarizer 6 or anode 4. Examples of such a material are tantalum, molybdenum, niobium, zinc, and conductive plastics such as Bakelite base materials, monochloro trifluorethylene polymers, with provision made to render these plastics conductive. Layer 8 may be applied to one face of the silver 2 prior to forming the silver halide on the other face, an example such application being to glue it thereon with a conductive glue such as a carbon loaded resin. An example of a resin which may be used is polyvinyl butyral. Washers such as shown at 10 are provided between constituent cells A and B. A washer 10 in the present embodiment may consist of an insulating nonreactive material and is preferable in a ring form. The outer diameter of washer 10 is equal to the diameter of the silver disc 2, the inner diameter is equal to the diameter of depolarizer layer 10. The thickness of washer 10 preferably exceeds that of depolarizer disc 6 slightly, say less than 1 mil so that upon assembling the battery, the washer is compressed insuring the prevention of flow of potting compound between cell units. The stack of constituent cells A and B may be encased in a piece of glass tubing 12 of approximate length and close fitting diameter, the open ends of tube 12 being sealed with a suitable compound such as a potting compound 14 which sets at room temperature in about 12 to 24 hours. An example of potting compound 14 is an epoxy resin. However, any potting compound well known in the art is applicable. Cells A and B may also preferably be stacked in potting compound 14 such as the epoxy resin instead of glass tubing 12.

To assemble the battery, non-reactive electronically conductive layer 8 is glued with a conductive glue such as a conductive adhesive or a glue having some carbon therein on the untarnished face of the silver foil, the halide layer 4 having been formed on the other face. The silver discs of desired size are punched out of the prepared foil, depolarizer disc 6 is placed on halide layer 4 and washer 8 is placed around depolarizer disc. End plates 16 consisting of a non-reactive electronically conductive material, such as molybdenum, tantalum, in conjunction with bimetals such as brass, steel, etc., and having electrical contacts 18 thereon respectively are placed on each end of the stack and pressure to make good physical contact between the cells is applied. The stack is then preferably completely encased in potting compound 14. The voltage of the battery is the series addition of the voltages of the cells.

Other cell systems containing solid crystallize ion electrolytes and voltages thereof are set forth in the following table:

| System: | Voltages |
|---|---|
| 1. $Ag/AgI/I_2O_5$ | 0.58 |
| 2. $Ag/AgI/AuI$ | 0.60 |
| 3. $Ag/AgI/HIO_4$ | 0.88 |
| 4. $Cd/CdCl_2/CuCl_2$ | 1.19 |
| 5. $Cd/PbCl_2/CuCl_2$ | 1.19 |
| 6. $Cd/PbCl_2/HgCl_2$ | 0.86 |
| 7. $Pb/PbCl_2/CuCl_2$ | 1.30 |
| 8. $Pb/PbCl_2/PbO_2$ | 0.95 |
| 9. $Pb/PbCl_2/CuCl_2$ | 1.05 |
| 10. $Al/PbCl_2/CuCl_2$ | 1.25 |
| 11. $Al–Mg/PbCl_2/CuCl_2$ | 1.85 |
| 12. $Mg/BaCl_2 2H_2O/CuCl_2$ | 2.20 |
| 13. $Mg/BaCl_2 2H_2O/PbCl_2$ | 1.40 |
| 14. $Mg/BaCl_2 2H_2O/I_2O_5$ | 2.20 |
| 15. $Mg/BaCl_2 2H_2O/I_2$ | 2.10 |
| 16. $Mg/BaCl_2 2H_2O/AgCl$ | 1.56 |
| 17. $Mg/PbCl_2/CuCl_2$ | 2.0 |
| 18. $Mg/PbCl_2/I_2O_5$ | 2.0 |
| 19. $Mg/PbCl_2/I_2$ | 1.90 |
| 20. $Mg/PbF_2/CuCl_2$ | 1.50 |
| 21. $Mg/PbF_2/I_2O_5$ | 1.60 |
| 22. $Mg/PbI_2/CuCl_2$ | 1.55 |
| 23. $Mg/PbI_2/I_2O_5$ | 1.66 |
| 24. $Mg/PbI_2/I_2$ | 1.80 |
| 25. $Ag/AgX/RbBr_3$ | --- |
| 26. $Ag/AgX/RbBr_2I$ | --- |
| 27. $Ag/AgX/RbI_3$ | --- |
| 28. $Ag/AgX/CsI_3$ | --- |
| 29. $Ag/AgX/CsBr_3$ | --- |
| 30. $Ag/AgX/CsBrI_2$ | --- |

(X is Cl, Br, or I)

It has been found that when solid ion electrolyte cells are "doped" with a small amount of significant soluble impurity to induce lattice defects in the crystalline electrolyte, the flash current of these cells is increased manyfold. For example, when about 1% by weight of $CdBr_2$ or other bi- or tri-valent halide is added to the silver halide solid electrolyte in a system such as $$Ag/AgBr/CuBr_2$$

a four fold increase in flash current results.

While there have been described what, at present, are considered to be the preferred embodiments of the invention, it will be understood by those skilled in the art that various changes and modifications may be made herein without departing from the invention and it is, therefore, aimed in the appended claims to cover all such modifications as fall within the spirit and scope of the invention.

What is claimed is:

1. A high voltage miniature pile type battery comprising a stack of a plurality of primary cells, each of said cells consisting of a silver foil of about 1 to 10 mils thickness, said silver foil having on one surface, a 0.1 to 2.0 mils layer of silver bromide provided by tarnishing said silver foil in a heated chamber containing bromine vapor, a 4 to 15 mils depolarizer film consisting of a mixture of carbon black and a solid depolarizer material selected from the group consisting of iodine, cupric chloride, mercuric chloride, silver chloride, lead chloride, lead oxide, iodine pentoxide and halides of rubidium and caesium in a film forming elastomeric resin positioned on said silver bromide layer and an 0.8 to 1.0 mil layer of a non-reactive conductive material selected from the group consisting of tantalum, molybdenum, niobium, and conductive plastics, said conductive layer being applied to one face of said silver foil by a conductive glue prior to forming said silver bromide on the other face of said silver foil.

2. A battery as defined in claim 1 wherein said depolarizer layer has a diameter smaller than said silver disc and said battery includes a non-conductive non-reactive ring washer having an outer diameter equal to the diameter of said disc, an inner diameter equal to the diameter of said depolarizer layer and a thickness equal to the thickness of said depolarizer layer positioned around said layer, and non-reactive electronically conductive end plates on opposite ends of said stack, said stack being sealed in a potting compound.

References Cited in the file of this patent

UNITED STATES PATENTS

| | | |
|---|---|---|
| 1,920,151 | Ruben | July 25, 1933 |
| 2,519,054 | Woodring | Aug. 15, 1950 |
| 2,572,017 | Ellis | Oct. 23, 1951 |
| 2,690,465 | Broder | Sept. 28, 1954 |
| 2,696,513 | Lehovec | Dec. 7, 1954 |